No. 666,358.                            Patented Jan. 22, 1901.

A. SAMUELSON.
BICYCLE SUPPORT.
(Application filed Oct. 1, 1900.)

(No Model.)

Witnesses                      A. Samuelson, Inventor by C. A. Snow & Co.

Attorneys

UNITED STATES PATENT OFFICE.

ALFRED SAMUELSON, OF PAXTON, ILLINOIS.

BICYCLE-SUPPORT.

SPECIFICATION forming part of Letters Patent No. 666,358, dated January 22, 1901.

Application filed October 1, 1900. Serial No. 31,713. (No model.)

*To all whom it may concern:*

Be it known that I, ALFRED SAMUELSON, a citizen of the United States, residing at Paxton, in the county of Ford and State of Illinois, have invented a new and useful Bicycle-Support, of which the following is a specification.

This invention relates to bicycle-supports in general, and more particularly to that class wherein the support is carried by the bicycle in such position that it may be easily moved into and out of operative position at will, one object of the invention being to provide a simple, cheap, and efficient construction which may be attached to the bottom bar of the bicycle-frame and which when in its operative position will engage the front wheel of the bicycle and prevent turning of the wheel and movement of the fork-stem in the head.

Further objects and advantages of the invention will be evident from the following description.

Figure 1:
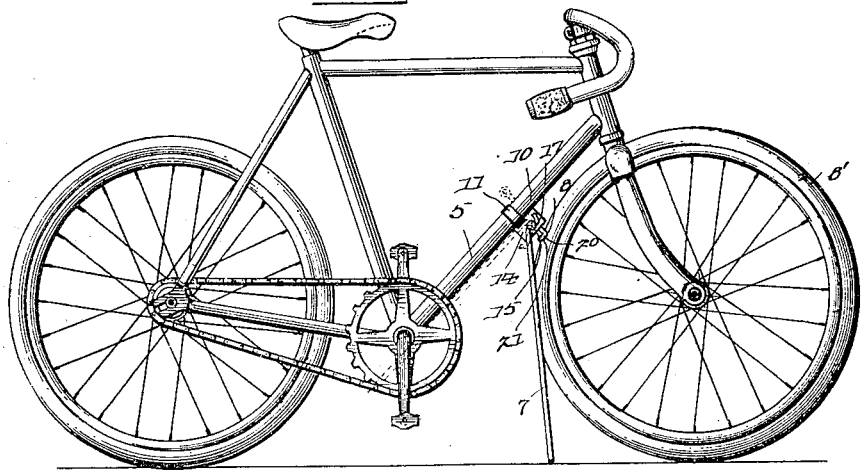
Figures 2, 3:
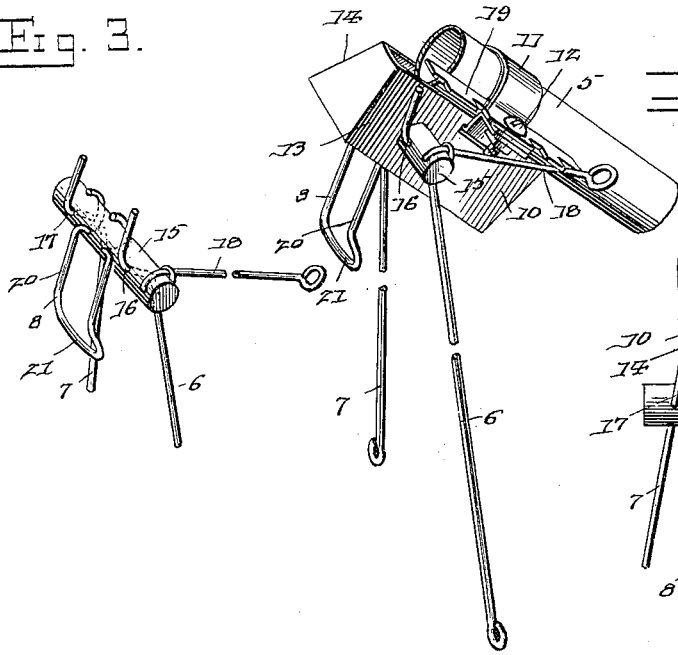
Figure 4:
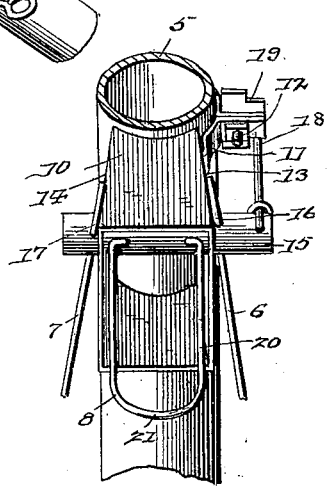

In the drawings forming a portion of this specification, and in which like numerals of reference indicate similar parts in the several views, Figure 1 is a side elevation of a bicycle, showing the operative position of the support thereon. Fig. 2 is a perspective view showing a portion of the bottom bar of the bicycle-frame and the support attached thereto and in its operative position, the legs of the support being partly broken away. Fig. 3 is a detail perspective view showing the shaft which carries the supporting-legs and the brake for engagement with the front wheel of the bicycle. Fig. 4 is a front elevation of the upper portion of the support, with the means for holding it in place.

Referring now to the drawings, the present support is applied to the bottom bar 5 of a bicycle-frame, and besides including supporting-legs 6 and 7 has also a brake member 8, which is adapted to impinge the front wheel 8 of the bicycle to prevent rotation of the wheel and also pivotal movement of the fork-stem, as shown in Fig. 1 of the drawings. The support includes also a central casing 10, to which is secured a strap 11, adapted to fit around the bottom bar 5, the ends thereof being bent outwardly and having alining perforations for engagement by a clamping-bolt 12. The sides 13 and 14 of the casing diverge downwardly, and through these diverging sides is passed a rock-shaft 15. The rock-shaft 15 has transverse perforations therethrough in its end portions which project exteriorly of the casing, and said perforations are located near the sides of the casing. The legs 6 and 7 of the support, as shown, consist each of a single wire, the lower end of which is formed into an eye to present a foot, while the upper end is bent laterally, as at 16 and 17, respectively, and passed through the perforations in the rock-shaft, their protruding extremities being then bent upwardly to lie against the sides of the casing. As shown in Fig. 2 of the drawings, when the rock-shaft is in position for the supporting-legs to depend from the casing said legs lie divergingly because of lying against the downwardly-diverging sides of the casing, while the upper ends of the legs above the shaft converge because they lie against the sides of the casing also, said sides of course converging upwardly. Now if the shaft be rocked the upper extremities of the supporting-legs will be moved downwardly, so that the casing will in effect wedge therebetween, while the lower portions of the legs will move upwardly, and because of the separation of the upper ends of the legs they will move inwardly to follow the upward convergence of the casing sides. When the upper ends of the legs are moved to lie longitudinally of the casing, the lower portions will assume a like position and will lie close against the under side of the bottom bar of the bicycle-frame, as indicated in dotted lines in Fig. 1 of the drawings.

To hold the supporting-legs at the desired point of their adjustment, an operating lever or handle 18 is engaged with a perforation in the rock-shaft or otherwise attached thereto, this lever being of spring material, so that at different points of its swinging movement when the shaft is rocked it may be engaged with a notch in the rack 19, which is mounted upon the clamping-bolt 12 between the ends of the strap 11, so as to be held securely thereby. Thus by manipulation of the lever or handle the supporting-legs may be moved into and out of operative position and may be locked in either position.

When the supporting-legs are in their operative positions, it is of course advisable that the front wheel of the bicycle be held from rotation and the front fork from turning, and for this purpose a wire 20 is bent into U shape and its ends are engaged with perforations in the rock-shaft, the web of the wire being bent laterally or rearwardly to form a seat 21, said wire being so positioned that when the supporting-legs are in their lowered position the seat of the wire 20 will be moved to receive the tire of the front wheel with sufficient pressure to prevent movement of the wheel or fork, the spring quality of the handle or lever 18 acting to hold the wire 20 in this position. When the supporting-legs are returned to their folded position, the wire 20 is moved from engagement with the wheel.

It will thus be seen that there is provided a simple and efficient form of support which holds the bicycle supported in an erect position and at the same time prevents movement thereof, the support being upon the bicycle at all times and when not in use being folded out of the way.

It will be understood that in practice modifications of the specific construction shown may be made and that any suitable materials and proportions may be used without departing from the spirit of the invention.

What is claimed is—

1. A bicycle-support comprising a block having a clip for attachment to a bicycle, a rack clamped by the clip to the block, a shaft rockingly mounted in the block, and supporting-legs engaged with the shaft, one of the legs being continued beyond the shaft for engagement with the rack to hold the shaft at different points of its oscillatory movement.

2. A bicycle-support comprising a supporting-block, a band engaged with the block and adapted to encircle a portion of a bicycle-frame, said band being adapted for engagement of a clamping-bolt with its free ends, a rack disposed between the ends of the band, a bolt engaged with the band and rack to actuate the clamp and hold the rack against movement, a shaft rockingly mounted in the block, and supporting-legs engaged with the shaft, one of said legs being continued beyond the shaft to form a latch for engagement with the rack to hold the shaft against oscillation.

3. A bicycle-support comprising a hollow block, a split band engaged with the block for holding it to a bicycle, a rack disposed between the ends of the band, a clamping-bolt engaged with the ends of the band and with the rack to hold the latter in position, supporting-legs engaged with a shaft rockingly mounted in the block and passing transversely therethrough, one of the legs being continued beyond the shaft for engagement with the rack to hold the shaft against oscillation, and a brake engaged with the shaft within the inclosure of the block and projecting therefrom for engagement with the wheel of a bicycle when the legs are moved to their operative positions.

In testimony that I claim the foregoing as my own I have hereto affixed my signature in the presence of two witnesses.

ALFRED SAMUELSON.

Witnesses:
C. E. BEACH,
C. S. SCHNEIDER.